July 15, 1969   J. SEIDMAN   3,455,575
PROMOTIONAL CARD
Filed July 3, 1967   2 Sheets-Sheet 1
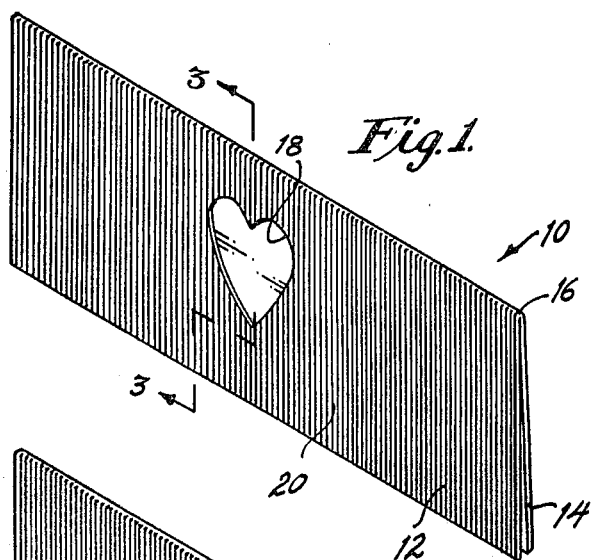
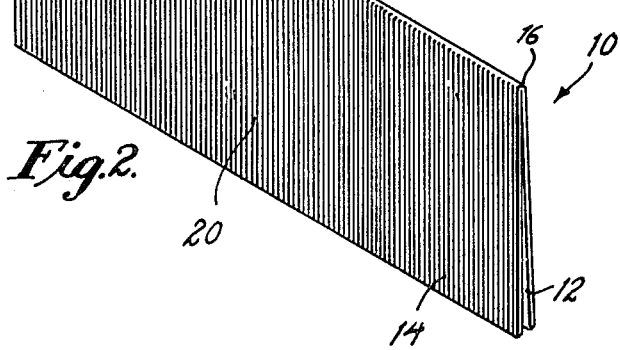
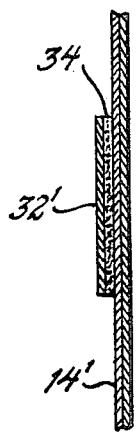
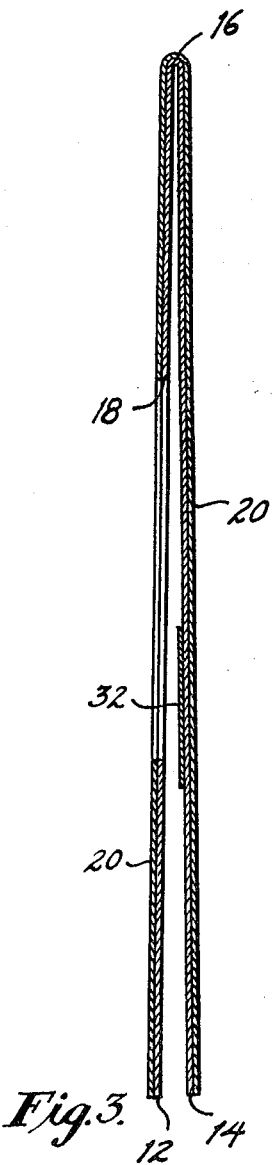
INVENTOR.
JACK SEIDMAN
BY Seidel & Gonda
ATTORNEYS.

July 15, 1969  J. SEIDMAN  3,455,575
PROMOTIONAL CARD
Filed July 3, 1967  2 Sheets-Sheet 2

INVENTOR.
JACK SEIDMAN
BY Seidel & Gonda
ATTORNEYS.

United States Patent Office 3,455,575
Patented July 15, 1969

3,455,575
PROMOTIONAL CARD
Jack Seidman, Philadelphia, Pa., assignor to Heart-O-Gold Corporation, Philadelphia, Pa., a corporation of Pennsylvania
Filed July 3, 1967, Ser. No. 650,860
Int. Cl. B42d 15/00; G09f 23/00
U.S. Cl. 283—6                 1 Claim

ABSTRACT OF THE DISCLOSURE

A promotional card bearing a plurality of indicia on an inside face thereof, at least some of the indicia being normally obscured by an erasable coating thereon, the normally obscured indicia providing a record of a single business transaction, so that sequential erasure of the coating reveals the record.

---

This invention relates to the structural features of promotional cards, and more particularly, promotional cards of the type wherein indicia denoting a business transaction are obscured by an erasable coating, so that erasure of the coating reveals the record.

The promotional card of the present invention is intended to be utilized by business establishments as a stimulus for the sale of services. For example, the present promotional card may be used by banks in connection with the opening of so-called "gift accounts" wherein the donor opens a savings account for a given amount in the name of the donee. A preferred form of the present promotional card for use with such a transaction could comprise a folded opaque base of paper-like material having exterior surfaces not unlike a conventional greeting card. Explanatory indicia or greetings may be included on interior faces of the card, and the obscured indicia may likewise be provided on an interior face. The obscured indicia may be arranged so that sequential erasure reveals the total amount of the gift. Thus, a promotional card with the aforementioned structural characteristics provides an intriguing and amusing means whereby the recipient is informed of the gift. The present promotional card serves to encourage gifts of the above-mentioned type, and heightens the interest and satisfaction of the recipient.

In the preferred form of the invention, the promotional card is also provided with indicia indicating the identity of the donor, and the institution at which the gift account was made.

Accordingly, it is an object of the present invention to provide a promotional card of novel construction.

It is another object of the present invention to provide a novel promotional card having obscured indicia thereon indicating the record of business transaction.

It is another object of the present invention to provide a promotional card having a plurality of obscured indicia thereon, the obscuring indicia providing in their totality a record of a single business transaction.

It is still another object of the present invention to provide a promotional card wherein obscured indica may be revealed for visual observation merely by erasing a metal layer applied over the indicia.

Other objects will appear hereinafter.

For the purpose of illustrating the invention, there are shown in the drawings forms which are presently preferred; it being understood, however, that this invention is not limited to the precise arrangements and instrumentalities shown.

FIGURE 1 is a perspective view showing in particular an outer front face of a promotional card in accordance with the invention.

FIGURE 2 is a perspective view showing in particular an outer rear face of a promotional card.

FIGURE 3 is an enlarged sectional view taken along the line 3—3 in FIGURE 1.

FIGURE 6 is a partial side sectional view of a portion of the promotional card, showing an alternative form of an obscuring coating for the indicia.

Figure 4:
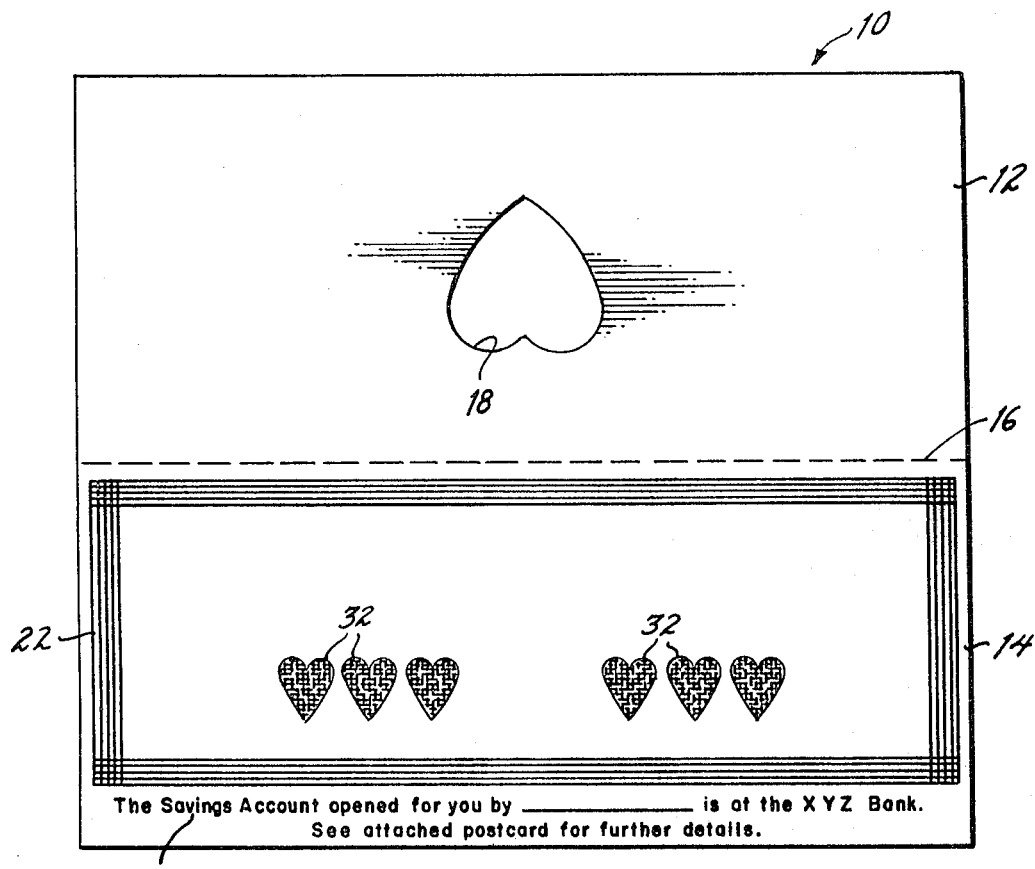
FIGURE 4 is a view showing the inner faces of a promotional card in accordance with the invention.

Referring now to the drawings in detail, wherein like numerals indicate like elements, there is seen in FIGURES 1, 2 and 4 a promotional card designated generally by the reference numeral 10. The card 10 comprises a base, which may be formed of substantially rigid material such as cardboard or the like, comprising a first panel 12 and a second panel 14. The first panel 12 may join the second panel 14 at a fold line 16 which forms, in effect, a hinge. For convenience, the first panel 12 may be referred to as a "front" panel, and the second panel 14 as a "rear" panel. The first panel 12 may include a cut-out opening 18 therethrough. The surfaces of the first and second panels 12 and 14 seen in FIGURES 1 and 2 may be referred to as outer surfaces, and those seen in FIGURE 4 as inner surfaces. The outer surfaces may be provided with a layer of decorative material, preferably opaque. For example, such material may take the form of metallic foil, such as gold or aluminum, or may be of ink, flocking, etc. The coating 20 is best seen in somewhat exaggerated scale, for the sake of clarity, in FIGURE 3.

Figure 5:
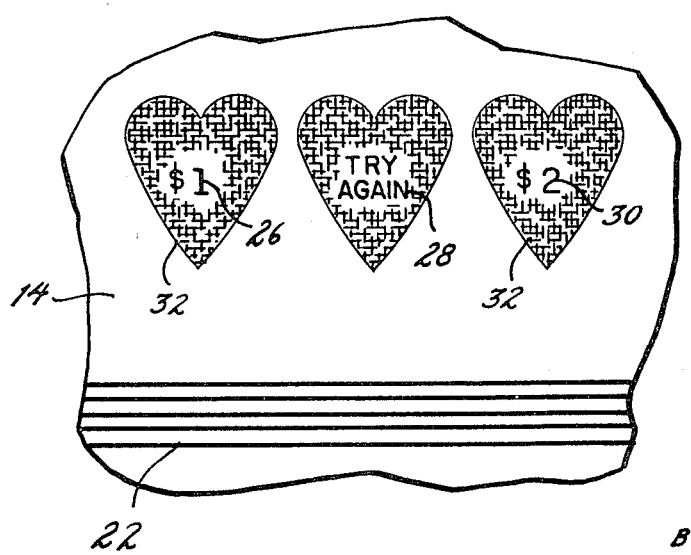
FIGURE 5 is an enlarged detailed view showing selected indicia after erasure of the obscuring coating.

Referring now to FIGURE 5, examples of the indicia which form an important part of the present invention are illustrated. Thus, the inner face of one of the panels, in this instance the second panel 14, may be provided with a decorative border design 22. Explanatory matter 24 may be provided adjacent the border design 22 such as to indicate the donor and the establishment at which the gift has been made. The explanatory matter 24 may also include instructions explaining the use of the card to the donee, or referring to separate instructions accompanying the card.

The inner face of the second panel 14 also bears printed indicia, for example, the indicia 26, 28 and 30 in FIGURE 5, which provide a record of a business transaction. For instance, the indicia 26, 28 and 30 may provide indication of the amount of the gift on behalf of the donee, as will be explained later. Referring again to FIGURE 4, the transaction-indicating indicia are normally obscured by a layer of opaque obscuring material 32. The obscuring material 32 is advantageously of a bright and attractive color, and may be shaped, as in the present drawings for decorative or symbolic effect.

The obscuring material 32 may be a layer of metal applied directly to the face of the panel 14 by spraying bronze powder thereon. Alternatively, the layer of metal may be gold leaf foil applied to the face by way of a roll on a hot press embossing machine. When the obscuring material 32 is applied in the latter manner, it may be easily removed to enable one to ascertain the amount of the indicia therebelow. Removal may be by an ordinary eraser.

In FIGURE 6 there is shown an alternative arrangement whereby the obscuring material may be applied to the panel. In the alternative arrangement, a layer of shellac or transparent ink is applied to the panel 14'. The obscuring material 32' is next applied over the layer 34. In the case of the embodiment shown in FIGURE 3, it has been found that erasure of the material 32 leaves the indicia therebelow relatively undisturbed, and quite legible. With the embodiment shown in FIGURE 6, the obscuring material 32' is erased, leaving the transparent ink or shellac layer 34, and rendering the indicia legible. The opaque coating 20 on the outer surfaces of the card prevent reading of the indicia through the card. Other means of providing and obscuring the indicia may be used if desired.

The manner in which the transaction-indicating indicia serve to indicate the size of the transaction should now be apparent. Thus, the donee, whether through the printed matter 24 or accompanying literature, is advised to erase the obscuring material in a particular order, for example, from left to right. In so doing, referring to FIGURE 5, he would first reveal the monetary denomination one dollar indicated by the indicia 26. Next, with the indicia 28, he would uncover the words "TRY AGAIN" or the like, intended to further whet his curiosity. The indicia 30 indicates a further gift of two dollars. The sum of all of the amounts would indidate the size of the gift. Businesses or institutions could offer the novel promotional card with obscured indicia totaling the amounts with which they permit establishment of gift accounts. Thus, cards with monetary denominations totaling five dollars, ten dollars, twenty dollars, for example, could be provided. Although the use of the promotiona card has been discussed above in connection with the establishment of gift bank accounts, it could be used to equal advantage for gifts of credit in retail establishments or the like. The present promotional card could be provided the donor for mailing to the recipient of the gift, or the business may itself send the card to the recipient as a service to its customer, the donor.

The cut-out opening 18 in the first panel 12 is decorative, and also functional in that it provides a means whereby portions of the inner face of the second panel 14 are instantly visible upon removal of card 10 from an envelope. The indicia, if any, visible through the cut-out opening 18 may provide an appropriate message such as birthday greetings or the like, or may indicate the name of the business or institution at which the gift was made. The cut-out opening 18 would not, in a preferred embodiment, reveal the obscured indicia. Thus the first panel 12 serves to protect the material 32 from damage until such time as the donee erases it.

The present invention may be embodied in other specific forms without departing from the spirit or essential attributes thereof and, accordingly, reference should be made to the appended claims, rather than to the foregoing specification as indicating the scope of the invention.

I claim:
1. A promotional card comprising an opaque rectangular base of substantially rigid material, said base comprising front and rear panels of substantially equal dimensions, a fold line between said panels whereby said front panel may be selectively placed in overlying relation to one face of said rear panel, said one face of said rear panel containing spaced indicia thereon, plural opaque heart-shaped metallic coatings covering said spaced indicia, said front panel overlying said heart-shaped metallic coatings when overlying said one face, said front panel having a centrally located heart-shaped opening therein, a portion of said rear panel not containing any of said indicia showing through said heart-shaped opening when said front panel is placed in overlying relation with said rear panel, said heart-shaped metallic coatings being erasable to enable said indicia to be ascertained, said indicia comprising numerals indicative of monetary denominations, and said indicia providing in their totality a record of a transaction so that erasure of said metallic coatings reveals said record.

References Cited
UNITED STATES PATENTS

| | | | |
|---|---|---|---|
| 1,551,660 | 9/1925 | Gove | 283—56 |
| 3,001,886 | 9/1961 | Schrewsbury et al. | 283—6 X |
| 3,055,117 | 9/1962 | Bernstein et al. | 283—6 X |
| 3,281,165 | 10/1966 | Edge | 283—6 |

OTHER REFERENCES

Oxydol Advertisement, May 6, 1965.

LAWRENCE CHARLES, Primary Examiner

U.S. Cl. X.R.

156—3, 22, 307; 161—217; 283—56